(12) United States Patent
Craft et al.

(10) Patent No.: US 6,313,980 B1
(45) Date of Patent: Nov. 6, 2001

(54) TRIM PLATE FOR PANELBOARDS AND SWITCHBOARDS

(75) Inventors: Hamon L. Craft, Plainville; Edward G. Barber, Milford; Mike P. Lafond, Wallingford; Robert J. Caggiano, Wolcott, all of CT (US); Robert L. Hilgendorf, Cypress, TX (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/548,416

(22) Filed: Apr. 13, 2000

(51) Int. Cl.$^7$ ........................................ H02B 1/01
(52) U.S. Cl. .............................. 361/627; 361/644
(58) Field of Search .................... 361/627, 628, 361/631, 634, 636, 641, 643, 644, 645, 647, 652, 656, 673

(56) References Cited

U.S. PATENT DOCUMENTS

| | | |
|---|---|---|
| 3,777,224 | 12/1973 | Meacham . |
| 3,786,313 * | 1/1974 | Coles et al. ........................... 361/627 |
| 3,808,509 | 4/1974 | Frazier . |
| 4,472,761 * | 9/1984 | Koslosky et al. ..................... 361/355 |
| 4,517,623 * | 5/1985 | Barner et al. ......................... 361/358 |
| 4,870,542 * | 9/1989 | Kopslosky et al. .................. 361/355 |
| 4,945,450 * | 7/1990 | Sabatella et al. ..................... 361/334 |
| 5,761,026 | 6/1998 | Robinson et al. . |
| 5,894,404 * | 4/1999 | Vrnak et al. .......................... 361/627 |

* cited by examiner

Primary Examiner—Gregory Thompson
(74) Attorney, Agent, or Firm—Cantor Colburn LLP; Carl B. Horton

(57) ABSTRACT

A panelboard or switchboard enclosure 10 for a plurality of electrical distribution components 34 includes a face panel 14 with an opening 26 formed in a central portion thereof. A filler plate 12 extends across the opening 26 and is secured to the face panel 14. The face panel 14 is secured to the frame of a box assembly or cabinet 16 by fasteners 30. Releasing fasteners 30 allows the face panel 14 and all filler plates to be removed. A first end 50 of the filler plate 12 is pivotally secured to the face panel 14 by a hinge 36, and a second end 54 is releasably secured to the face panel 14 by a fastener 38. Individual filler plates can be opened by releasing the fastener 38 and pivoting the filler plate 12 about the hinge 36 to reveal the electrical distribution component(s) 34 beneath that filler plate 12.

20 Claims, 4 Drawing Sheets

TRIM PLATE FOR PANELBOARDS AND SWITCHBOARDS

BACKGROUND OF THE INVENTION

This application relates to electrical panelboards, also known as powerpanels, and switchboards. More specifically, this application relates to trim plates for use with electrical panelboards and switchboards.

Panelboards and switchboards are enclosures used in electrical distribution systems for the mounting of various electrical distribution components. Such components may include switches, protective devices (e.g., circuit breakers), and instruments. These components are mounted to a plurality of mounting rails within the panelboard or switchboard and receive electrical power via buses that extend within the panelboard or switchboard.

A panelboard (powerpanel) includes a single faze panel or group of panel units designed for assembly in the form of a single face panel. The face panel is mounted to a cabinet or box assembly, which is placed against a wall or partition. Panelboards are accessible from the front. Panelboards are often fitted with an external door, known as a "door-in-door" or "single door" enclosure, to prevent unauthorized access to the electrical distribution components. A "power panelboard" is a panelboard having less than a certain percentage of its over-current devices protecting lighting and appliance branch circuits.

A switchboard includes a large single panel, frame, or assembly of panels having the electrical components mounted on the face panel or back panel or both. Switchboards may be accessible from the rear, the front, or the sides.

The face panel of a panelboard or switchboard can include a four-piece front, a single piece front or a door. A four-piece front is typically constructed from four substantially flat panels configured in a single plane to form a perimeter around a central opening. The central opening in the face panel allows access to the electrically active (live) portions of the electrical distribution components mounted in the panelboard or switchboard. A single piece front is similar to a four-piece front, but is formed from a single, substantially flat panel having an opening formed in a central portion. In a door-in-door enclosure, an electrical safety panel, called a "dead front", is mounted behind a door. The dead front is typically formed from four-pieces, with flanges extending from the panels to form a perimeter around the dead front. Like the single piece front and the four-piece front, the dead front has a central opening formed therein to allow access to the electrically active portions of the electrical distribution components.

To prevent personnel from contacting the electrically active parts of the electrical distribution components, a plurality filler plates (cover plates) are positioned across the central opening. The filler plates may have one or more apertures through which the operating handles of the electrical distribution components extend. Alternatively, the filler plates may have no apertures (blank) to cover portions of the central opening where no electrical distribution components are mounted. A typical panelboard or switchboard will have a number of different types of filler plates to accommodate different arrangements of electrical distribution components within the panelboard or switchboard.

In modem power panelboards and switchboards, filler plates are secured to the mounting rails along with the electrical distribution components. Typically, a mounting tab extends from the mounting rails to secure the filler plates above the electrical distribution components. In order to remove the filler plates, a technician must first remove the face panel, which is secured to the cabinet or box assembly by a plurality of screws disposed around the perimeter of the face panel. Next, each filler plate must be removed individually. In sum, removal of one or more of the individual filler plates is a time consuming process that increases the amount of time needed to perform routine maintenance on the electrical distribution components. In addition, if the mounting tab were to break, replacement of the broken tab could require removal of an individual electrical distribution component, which increases maintenance time.

BRIEF DESCRIPTION OF THE INVENTION

An enclosure for a plurality of electrical distribution components includes a face panel or dead front with an opening formed in a central portion of the face panel or dead front. A filler plate extends across the opening. The filler plate includes a first end and a second end. The first end is releasably secured to the face panel or dead front on a first side of the opening, and the second end is releasably secured to the face panel or dead front on a second side of the opening. Attaching the filler plate to the face panel or dead front allows a technician to remove the filler plate along with the face panel or dead front rather than requiring to remove the face panel or dead front and filler plates separately.

In one embodiment, the first end of the filler plate is hingedly secured to the face panel or dead front. The hinged filler plate allows a technician to perform maintenance or testing on an electrical distribution component quickly by pivoting the filler plate about the hinge to reveal the electrical distribution component(s) beneath that filler plate.

DETAILED DESCRIPTION OF THE INVENTION

Figure 1:
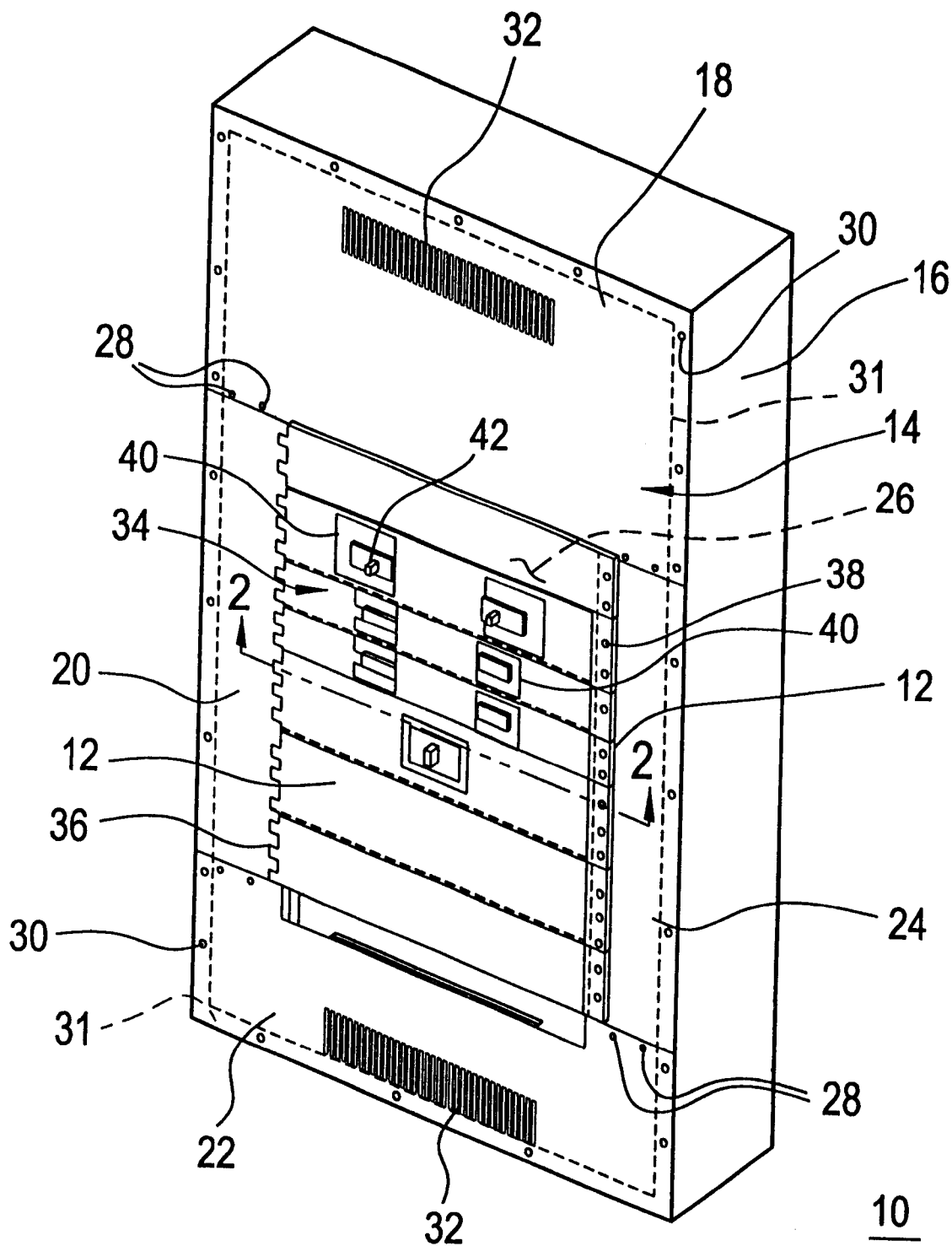
FIG. 1 is a front perspective view of an enclosure with a plurality of filler plates of the present invention.

FIG. 1 is a front perspective view of an enclosure 10 with a plurality of filler plates 12 secured to a face panel 14. In FIG. 1, enclosure 10 is shown as a power panelboard and face panel 14 is shown as a four-piece front; however, it will be recognized by one skilled in the art that the same arrangement can also be used to mount filler plates 12 to a switchboard or panelboard with a four-piece front, a single piece front, a door, or a dead front. Enclosure 10 includes a face panel 14 secured to a cabinet or box assembly 16. Face panel 14 is constructed from four substantially flat panels 18, 20, 22, 24 configured in a single plane to form a perimeter around a central opening 26. Top and bottom panels 18, 22 are secured to side panels 20, 24 by fasteners such as screws, bolts, rivets or the like (not shown) disposed through holes 28. Face panel 14 is releasably secured to the cabinet or box assembly 16 by fasteners 30 such as screws, bolts, latches or the like (not shown) disposed through holes located around the perimeter of face panel 14. Fasteners 30 extend through face panel 14 and through a flange 31 (shown in phantom) that extends inward from the perimeter of the cabinet or box assembly 16. Top and bottom panels 18, 22 may include vents 32 disposed therein. Vents 32, when provided, allow for convective ventilation of the enclosure 10. Electrical distribution components 34 may include switches, protective devices (e.g., circuit breakers), and instruments, as is known in the art.

Each filler plate 12 includes a substantially flat panel 13 that extends across central opening 26, from side panel 20 to side panel 24. In a preferred embodiment, one end of each filler plate 12 is hingedly secured to side panel 20 by a hinge 36. The opposing end of each filler plate 12 is releasably secured to side panel 24 using fasteners 38 such as screws, bolts, latches, or snap-fit clips. For example, fasteners 38 may include a quarter-turn latch, the design of which is known in the art. Filler plates 12 can be opened individually by releasing the fastener 38 and pivoting the filler plate about its hinge 36. In addition, all of the filler plates 12 can be removed simultaneously by removing face panel 14. In an alternative embodiment, both ends of each filler plate 12 are releasably secured to their respective side panel (20 or 24) by fasteners 38.

As can be seen in FIG. 1, filler plates 12 can be of different sizes and configurations, depending on the configuration of the electrical distribution components 34 mounted within enclosure 10. For example, filler plates 12 may include apertures 40 disposed therein for allowing operating handles 42 of electrical distribution components 34 to extend therethrough. Apertures 40 can also be sized to allow service personnel to view rating data and read visual displays from the electrical distribution components 34. A number of the filler plates 12 may also be blank (i.e., include no openings). Blank filler plates 12 are used to cover the portions of central opening 26 where electrical distribution components 34 are not mounted to allow for future addition of electrical distribution components 34.

Figure 2:
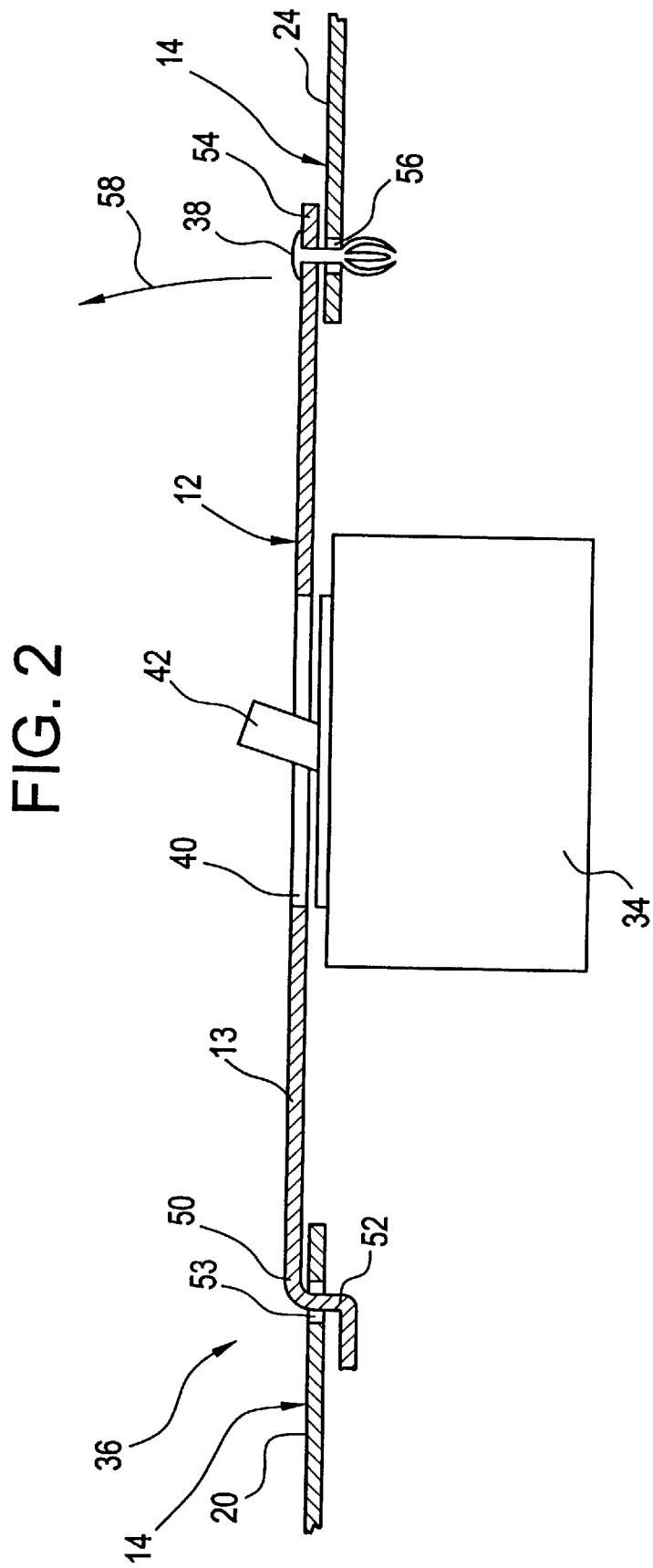
FIG. 2 is a top sectional view of a filler plate of FIG. 1.

FIG. 2 shows a top sectional view of a preferred embodiment of filler plate 12. Filler plate 12 is positioned on the external side of face panel 14 (i.e., on the opposite side of face panel 14 from the electrical distribution components 34). An end 50 of filler plate 12 includes an "L" shaped tab 52 depending therefrom. Each filler plate 12 includes one or more of these tabs 52. Tab 52 extends through a slot 53 disposed in side plate 20 to form the hinge 36 for connecting filler plate 12 and sideplate 20. Side plate 20 includes a number of slots 53 corresponding to the number of tabs 52 extending from the plurality of filler plates 12.

An end 54 of filler plate 12 includes fastener 38, shown here as a snapfit type fastener, extending through an aperture formed in filler plate 12. The snap-fit portion of fastener 38 extends through an aperture 56 disposed in side plate 24 to releasably engage the end 54 of filler plate 12 to side plate 24. The use of a snap fit type fastener is advantageous in that opening the filler plate can be done with or without the use of tools. Alternatively, bolts, screws, or latches (e.g., ¼ turn latches) can be used to releasably fasten the end of filler plate 12 to sideplate 24.

The hinge 36 allows the end 54 of filler plate 12 to pivot outward from sideplate 24 in the direction indicated by arrow 58. As the end 54 of filler plate 12 pivots outward from sideplate 24 (in the direction of arrow 58), filler plate 12 remains attached to and supported by sideplate 20 until the free end of the L-shaped tab 52 is substantially perpendicular to sideplate 20. At this position, the filler plate 12 can be removed from the sideplate 20 by pulling the filler plate 12 away from the sideplate 20 until the free end of the L-shaped tab 52 is removed from the slot 53. The filler plate 12 can be reinstalled by reversing this process.

Figure 3:
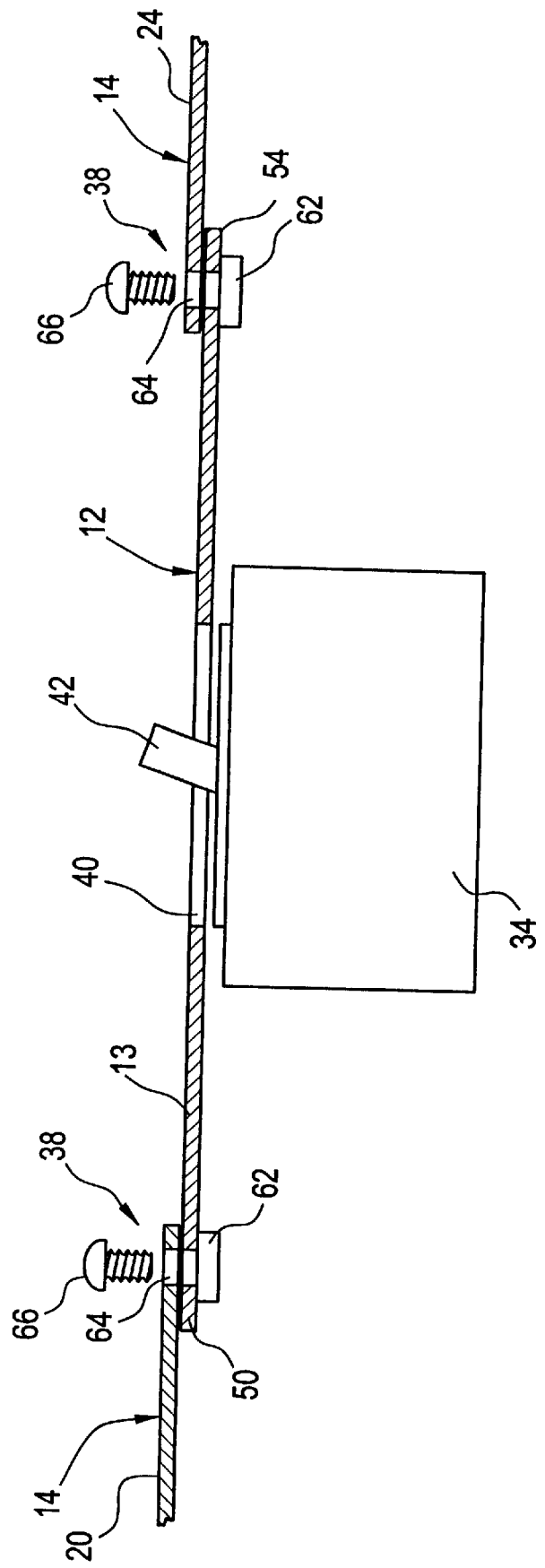
FIG. 3 is a top sectional view of an alternative embodiment of the filler plate of FIG. 1.

FIG. 3 shows an alternative embodiment of filler plate 12. In this embodiment, filler plate 12 is positioned on the internal side of face panel 14 (i.e., on the same side of face panel 14 as the electrical distribution components 34). The ends 50 and 54 of filler plate 12 include fasteners 38 extending therefrom for securing ends 50 and 54 to side plates 20 and 24, respectively. Each end of filler plate 12 includes one or more of these fasteners 38. In this embodiment, each fastener 38 includes a press nut 62 fixedly secured within an aperture formed in filler plate 12. Side plates 20 and 24 include apertures 64 disposed therein and positioned in relation to press nuts 62. Apertures 64 and press nuts 62 accept machine screws 66 for securing filler plate 12 to side plates 20 and 24. Press nuts 62 are fixedly secured to filler plate 12 to prevent press nuts 62 from rotating as machine screws 66 are being tightened.

Figure 4:
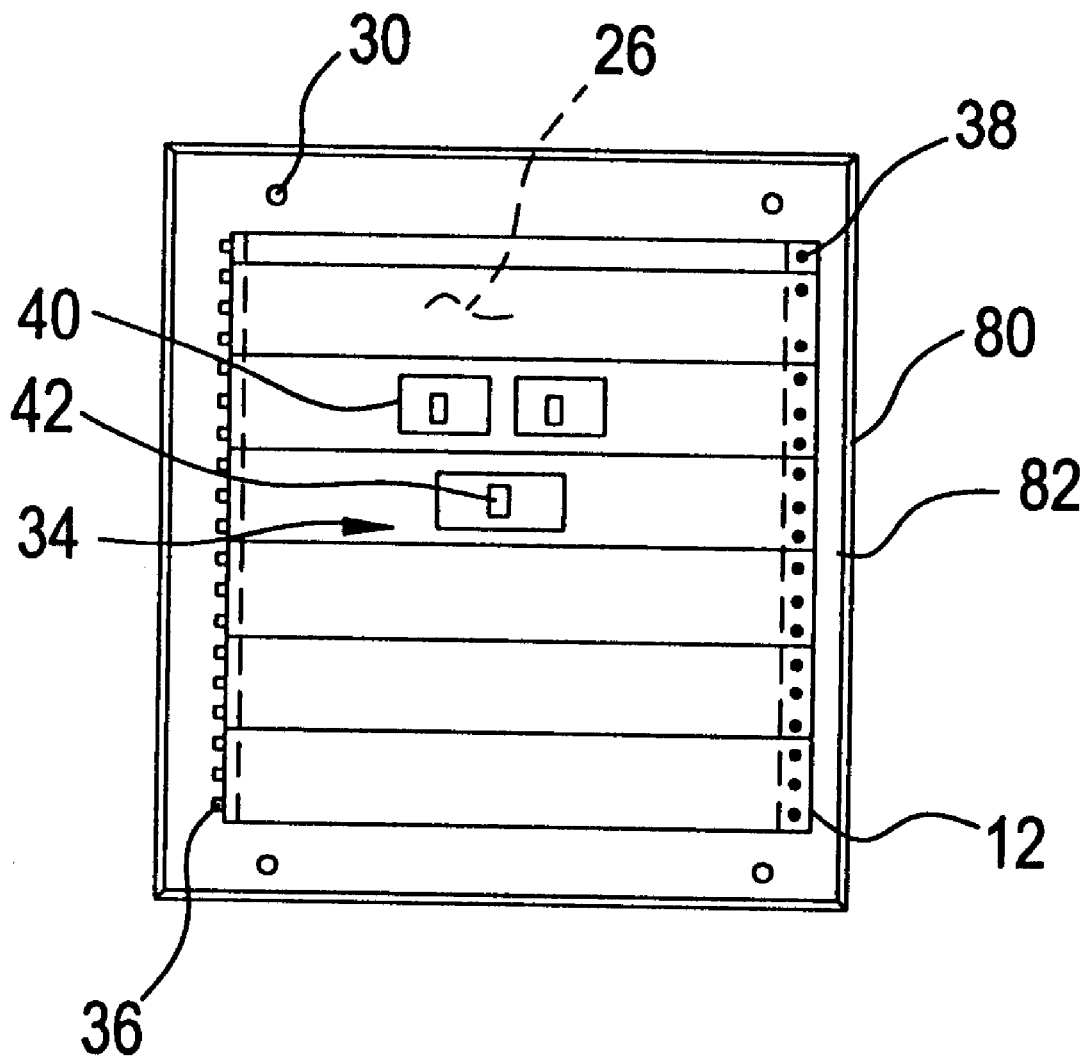
FIG. 4 is a front perspective view of a dead front with a plurality of filler plates of the present invention.

FIG. 4 shows a filler plate 12 of the present invention used in a dead front 80. Dead front 80 would be used in conjunction with a door in door enclosure (not shown), as is known in the art. Dead front 80 is a substantially flat surface having a flange 82 formed on its perimeter. Like the face panel 14 described hereinabove, the dead front 80 is typically formed from four pieces, and dead front 80 is attached to a cabinet or box assembly (not shown) by fasteners 30 extending through the dead front 80. However, it is contemplated that the dead front 80 may be constructed from any number of panels. The arrangement of filler plate 12 on dead front 80 is similar to that described hereinabove with reference to FIG. 2.

The enclosure 10 (shown in FIG. 1) of the present invention allows a technician to access the plurality of electrical distribution components 34 by releasing a few fasteners 30. Removal of the fasteners 30 allows the technician to remove face panel 14 or dead front 80 along with all of the filler plates 12, which are attached to the face panel 14 or dead front 80. Because the face panel 14 or dead front 80 and filler plates 12 can be removed quickly, the enclosure 10 allows maintenance or testing to be performed in less time than would be possible with enclosures of the prior art, which require the technician to remove each individual filler plate after removing the face panel or dead front.

The enclosure 10 of the present invention also allow s a technician to perform maintenance or testing on a few electrical distribution components by simply removing the fasteners 38 and pivoting the filler plate 12 about the hinge 36 to reveal the electrical distribution component(s) 34 beneath that filler plate 12. The hinged filler plates 12 allow the technician to perform maintenance or testing without first having to remove the entire face panel or dead front of the enclosure, thus reducing the time to perform maintenance or testing. In addition, the filler plate 12 described herein does not require the use of mounting tabs, as were used in enclosures of the prior art. The elimination of mounting tabs decreases the cost of the enclosure and eliminates the maintenance time previously required t o replace broke n mounting tabs.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A filler plate depending from one of an electrical panelboard and a switchboard, said filler plate comprising:
   a substantially flat panel having a first end and a second end;
   a hinge depending from said first end, said hinge includes a tab that extends through a slot formed in one of said electrical panelboard and said switchboard, said hinge pivotally secures said first end of said substantially flat panel to the one of said electrical panelboard and said switchboard; and
   a fastener depending from said second end, said fastener releasably secures said second end of said substantially flat panel to the one of said electrical panelboard and said switchboard.

2. The filler plate of claim 1, wherein said substantially flat panel includes an aperture formed therein, said aperture being sized to provide access to an electrical distribution component.

3. The filler plate of claim 1, wherein said hinge is configured to allow said substantially flat panel to be removed from said one of said electrical panelboard and said switchboard.

4. The filler plate of claim 1, wherein said fastener is selected from the group including, snap fit fasteners, latches, screws, and bolts.

5. An enclosure for a plurality of electrical distribution components, the enclosure comprising:
   a face panel having an opening formed in a central portion thereof and a slot formed on one side of said opening;
   a filler plate extending across said opening, said filler plate including a first end and a second end, said first end being releasably secured to said face panel on a first side of said opening and said second end being hingedly secured to said face panel on a second side of said opening; and
   a hinge including a tab that extends through said slot, said hinge hingedly securing said first end of said filler plate to said face panel.

6. The enclosure of claim 5, wherein said hinge includes:
   a tab extending from said first end of said filler plate, and
   a slot disposed in said face panel, said slot receiving said tab.

7. The enclosure of claim 6, wherein said tab is L-shaped.

8. The enclosure of claim 5, wherein said face panel includes four substantially flat panels configured in a single plane to form a perimeter around the central opening.

9. The enclosure of claim 5, wherein said filler plate includes an aperture formed therein, said aperture providing access to one of the plurality of electrical distribution components.

10. The enclosure of claim 5, further including:
    a fastener for releasably securing said second end of said filler plate to said face panel.

11. The enclosure of claim 10, wherein said fastener is selected from the group including snap fit fasteners, bolts, screws, and latches.

12. The enclosure of claim 10, wherein said fastener includes a press nut secured to said second end of said filler plate.

13. An enclosure for a plurality of electrical distribution components, the enclosure comprising:
    a dead front having an opening formed in a central portion thereof and a slot formed on one side of said opening;
    a filler plate extending across said opening, said filler plate including a first end and a second end, said first end being releasably secured to said dead front on a first side of said opening and said second end being hingedly secured to said dead front on a second side of said opening; and
    a hinge including a tab that extends through said slot, said hinge hingedly securing said first end of said filler plate to said dead front.

14. The enclosure of claim 13, wherein said hinge includes:
    a tab extending from said first end of said filler plate, and
    a slot disposed in said dead front, said slot receiving said tab.

15. The enclosure of claim 14, wherein said tab is L-shaped.

16. The enclosure of claim 13, wherein said dead front includes four substantially flat panels configured in a single plane to form a perimeter around the central opening.

17. The enclosure of claim 13, wherein said filler plate includes an aperture formed therein, said aperture providing access to one of the plurality of electrical distribution components.

18. The enclosure of claim 13, further including:
    a fastener for releasably securing said second end of said filler plate to said dead front.

19. The enclosure of claim 18, wherein said fastener is selected from the group including snap fit fasteners, bolts, screws, and latches.

20. The enclosure of claim 18, wherein said fastener includes a press nut secured to said second end of said filler plate.

* * * * *